US008055254B2

(12) United States Patent
Donovan et al.

(10) Patent No.: US 8,055,254 B2
(45) Date of Patent: *Nov. 8, 2011

(54) SYSTEMS AND METHODS FOR MEASURING THE PERFORMANCE OF A PROVIDER OF COMMUNICATIONS SERVICES

(75) Inventors: John Donovan, San Diego, CA (US); Rene Link, San Diego, CA (US); Todd Crick, San Diego, CA (US)

(73) Assignee: AT&T Mobility II LLC, Atlanta, GA (US)

( * ) Notice: Subject to any disclaimer, the term of this patent is extended or adjusted under 35 U.S.C. 154(b) by 19 days.

This patent is subject to a terminal disclaimer.

(21) Appl. No.: 12/773,299

(22) Filed: May 4, 2010

(65) Prior Publication Data

US 2010/0261470 A1    Oct. 14, 2010

Related U.S. Application Data

(63) Continuation of application No. 11/205,277, filed on Aug. 15, 2005, now Pat. No. 7,738,864.

(51) Int. Cl.
*H04W 24/00* (2009.01)
(52) U.S. Cl. ........................ 455/425; 455/423
(58) Field of Classification Search ............... 455/423, 455/425, 424, 67.11, 67.13, 67.14, 67.15, 455/67.7
See application file for complete search history.

(56) References Cited

U.S. PATENT DOCUMENTS

| | | | |
|---|---|---|---|
| 4,361,851 A | 11/1982 | Asip et al. | |
| 5,335,356 A * | 8/1994 | Andersson | 455/517 |
| 5,566,225 A | 10/1996 | Haas | |
| 5,675,510 A | 10/1997 | Caffey et al. | |
| 5,774,802 A | 6/1998 | Tell | |
| 5,796,952 A | 8/1998 | Davis et al. | |
| 5,872,588 A | 2/1999 | Aras et al. | |
| 5,987,306 A | 11/1999 | Nilsen et al. | |
| 5,991,735 A | 11/1999 | Gerace | |
| 6,115,680 A | 9/2000 | Coffee et al. | |
| 6,138,147 A | 10/2000 | Weaver et al. | |
| 6,397,256 B1 | 5/2002 | Chan et al. | |
| 6,405,245 B1 | 6/2002 | Burson et al. | |

(Continued)

FOREIGN PATENT DOCUMENTS

EP    0849909    6/1998

(Continued)

OTHER PUBLICATIONS

PCT International Preliminary Report on Patentability for PCT/US06/32826, Jun. 18 2008.

(Continued)

*Primary Examiner* — Christopher M Brandt
(74) *Attorney, Agent, or Firm* — Woodcock Washburn LLP

(57) ABSTRACT

Systems and methods for measuring the performance of a provider of communications service are described. A plurality of mobile communications devices measure average power received, signal to noise ratio, voice quality, blocked and dropped calls, or any combinations of such measurements. The device may also receive a set of data identifying the location of the device. The device may transmit one or more communications signals to a server computer system with such measurements and location data. The measurements and location data may be stored in a database, and new data may be created and transmitted illustrating a subset of the measurements and location data.

14 Claims, 12 Drawing Sheets

U.S. PATENT DOCUMENTS

| | | |
|---|---|---|
| 6,405,251 B1 | 6/2002 | Bullard et al. |
| 6,434,364 B1 | 8/2002 | O'Riodain |
| 6,456,852 B2 | 9/2002 | Barr |
| 6,470,386 B1 | 10/2002 | Combar et al. |
| 6,603,966 B1 | 8/2003 | Sheffield |
| 6,614,126 B1 | 9/2003 | Mitchell |
| 6,745,011 B1 | 6/2004 | Hendrickson et al. |
| 6,754,470 B2 * | 6/2004 | Hendrickson et al. ..... 455/67.11 |
| 6,795,444 B1 | 9/2004 | Vo et al. |
| 6,819,924 B1 * | 11/2004 | Ma et al. ................ 455/425 |
| 6,842,431 B2 | 1/2005 | Clarkson |
| 6,970,702 B1 * | 11/2005 | Martin ................ 455/424 |
| 7,155,167 B1 * | 12/2006 | Carty ................ 455/67.11 |
| 7,212,815 B1 | 5/2007 | Juric |
| 7,218,895 B1 | 5/2007 | Raghavan |
| 2002/0025795 A1 | 2/2002 | Sharon et al. |
| 2002/0035605 A1 | 3/2002 | McDowell et al. |
| 2002/0138607 A1 | 9/2002 | O'Rourke et al. |
| 2003/0023681 A1 | 1/2003 | Brown et al. |
| 2003/0134631 A1 | 7/2003 | Snyder et al. |
| 2007/0026853 A1 | 2/2007 | Stevens et al. |

FOREIGN PATENT DOCUMENTS

| | | |
|---|---|---|
| GB | 2348777 | 6/2006 |
| WO | WO 98/26541 | 6/1998 |

OTHER PUBLICATIONS

PCT Int'l Search Report and Written Opinion for PCT/US 06/32826, Mailing date Apr. 30, 2007, (7pgs.).

* cited by examiner

SYSTEMS AND METHODS FOR MEASURING THE PERFORMANCE OF A PROVIDER OF COMMUNICATIONS SERVICES

CROSS-REFERENCE TO RELATED APPLICATION

This application is a continuation of U.S. patent application Ser. No. 11/205,277, filed on Aug. 15, 2005, entitled "Embedded Wireless Benchmarking Systems and Methods," the contents of which are incorporated by reference herein in its entirety.

TECHNICAL FIELD

The present invention relates generally to wireless communications, and more specifically to the measurement of the performance of wireless communications networks.

BACKGROUND

There are many options in choosing a carrier for wireless voice communications. Specifically, the competition for customers among wireless carriers operating cellular networks can be intense. Maintaining high quality service can be an important consideration in attracting and maintaining customers. Poor network performance can lead to customer losses and increase churn, factors which can be costly.

Drive-test systems are a primary tool used by providers to measure performance from a subscriber perspective. Drive-test systems, as the name implies, are tools that characterize the performance of a system by driving around and making measurements. Such systems may rely on a technician or other professional to drive to different coverage areas and make service-quality measurements. Such systems may employ a receiver to measure performance based on a variety of quality metrics. The receiver may be as simple as a phone or as complex as a digital receiver specifically created to measure such metrics as pilot pollution, missing neighbors and base-station timing errors.

A limitation of this approach is that it generally requires a technician or other professional to drive around and make the measurements. This often entails the use of expensive electronic equipment, costs associated with the vehicle, and personnel costs for the measurement technician. There are some drive test solutions where the measurement is done automatically, requiring less administration by a technician. Such systems are often dubbed "unattended" systems, while systems requiring professional, ongoing measurement are often referred to as "attended" systems. Unattended systems may also be associated with a permanent location.

Nonetheless, there are certain inherent limitations associated with "drive test" solutions. Because of costs, measurement is often geographically limited to major markets and roads, and measurements are only taken at certain times. Also, drive test solutions are typically directed at a single carrier, making competitive benchmarking of multiple carriers a challenge. Thus, there exists a need in the art to create solutions that address the inherent limitations associated with drive testing, while continuing to measure the performance of a wireless service from the subscriber perspective at a variety of locations.

SUMMARY

Embodiments of the invention provide systems and methods for measuring the performance of a provider of communications service. According to some embodiments, a plurality of mobile communications devices are configured to receive a range of frequencies of electromagnetic waves. In some embodiments, the range may comprise one or more signals from a communications service provider, which may be a wireless carrier operating a cellular system. Each signal may comprise one or more modulated voice signals. According to various embodiments, each device may measure a variety of signal quality metrics, which may include average power received, signal to noise ratio, voice quality, blocked and dropped calls, data network metrics, or any combinations of such measurements. A device may associate a time which one or more of the various measurements. Each device may receive a set of data identifying the location of the device. This location based data may be comprised of GPS coordinates. In some embodiments, signal quality metrics are measured during the regular and customary use of the device by a user.

According to various embodiments, each Device transmits a communications signal which includes the average power received by the range, the voice quality measurement, and the location based data. According to some embodiments, a device may also transmit information on signal to noise ratio, blocked or dropped calls, or other signal quality metrics. In other embodiments, the additional measurements and times are included in the communications signal. In some embodiments, the measurements may occur at different intervals, related to time and movement. The communications signal may be transmitted via GPRS, although the signal may also be transmitted via a variety of other means known in the art.

In some embodiments, the system is further comprised of a server computer system, in communication with each device. The system may be configured to receive the communications signals from the devices, and store the information included in the communications signal in a database. In some embodiments, the system receives signal quality metrics representing different providers of communications services. In various embodiments, the system may transmit subsets of the information. The system may also use the information to create image data or tables that illustrate the measurements and performance in different geographic regions. In some embodiments, a method for providing a user interface which illustrates performance of a provider of communications services is described. The methods of the present invention may also be embodied in a computer-readable storage medium having a computer-readable program embodied therein.

Further areas of applicability of the present invention will become apparent from the detailed description provided hereinafter. It should be understood that the detailed description and specific examples, while indicating various embodiments of the invention, are intended for purposes of illustration only and are not intended to necessarily limit the scope of the invention.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 1B represents an example of an interface showing a table illustrating measurement of the performance of a provider of communication services according to various embodiments of the present invention.

FIG. 1F represents an example of a table illustrating certain data points for measuring the performance of a provider of communication services according to various embodiments of the present invention.

DETAILED DESCRIPTION OF ILLUSTRATIVE EMBODIMENTS

Figure 1A:
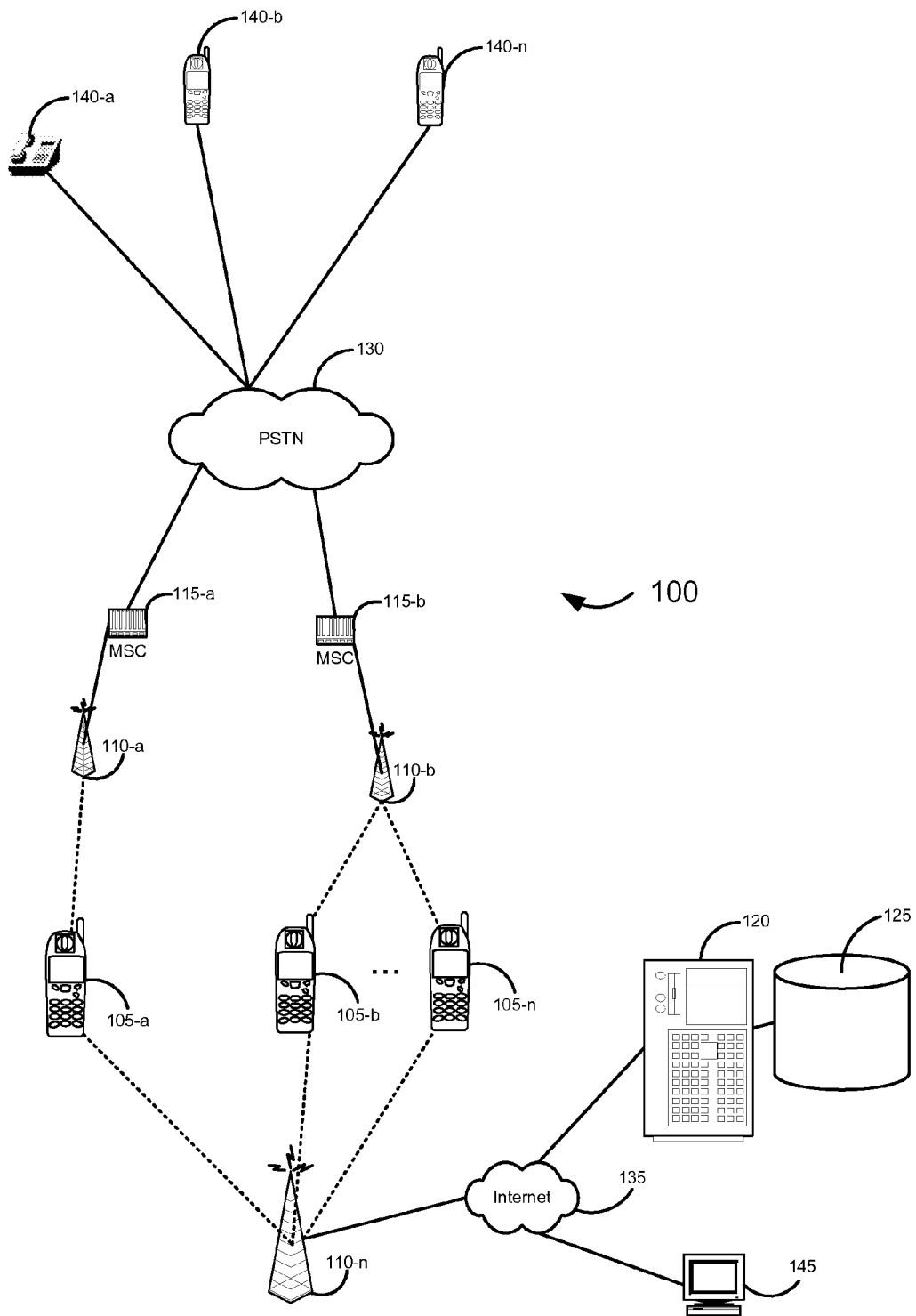
FIG. 1A illustrates a communications system that may be used to measure the performance of a provider of communications services according to various embodiments of the present invention.

Various embodiments of the present invention comprise systems and methods for measuring the performance of wireless carriers. A number of signal quality metrics may be captured passively from actual users as they go about their regular calling activity. Phones or other communication devices may be configured to make the quality measurements, and transmit the collected data to a database. The collected data may be parsed in a variety of different ways, and may be made available in real time over a web-based query and reporting tool. Quality metrics are therefore not limited to major markets or roads, and instead may be collected wherever users use their handsets. The performance data may thus be collected in real time over real world routes and usage scenarios.

This description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure.

Moreover, as disclosed herein, the terms "storage medium" or "storage media" may represent one or more devices for storing data, including read only memory (ROM), random access memory (RAM), magnetic RAM, core memory, magnetic disk storage mediums, optical storage mediums, flash memory devices or other machine readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as a storage medium. Processors may perform the necessary tasks.

I. Overview: Embodiments of the invention provide novel solutions, including systems, methods, and software, for measuring the performance of a provider of communications services. Certain embodiments of the present invention are illustrated in FIG. 1A. These embodiments may be included in a communications system 100, comprised of a plurality of Mobile Communications Devices 105, one or more Mobile Communications Base Stations 110, Service Provider Equipment 115 from one or more providers of communications services, and a Server Computer System 120 with an associated Database 125. A description of these elements follows.

The communications system components may be connected via a Network 135, which may be any combination of the following: the Internet, an IP network, an intranet, a wide-area network ("WAN"), a local-area network ("LAN"), a virtual private network, the Public Switched Telephone Network ("PSTN") 130, or any other type of network supporting communication between devices described herein, in different embodiments. The Network 135 may include both wired and wireless connections, including optical links. Many other examples are possible and apparent to those skilled in the art in light of this disclosure. In the discussion that follows, the Network 135 may or may not be noted specifically. If no specific means of connection is noted, it may be assumed that the link, communication or other connection between devices may be via the Network 135.

A. Device: According to different embodiments of the present invention, a Mobile Communications Device 105 may be a cellular phone, a VoIP phone, a personal digital assistant, a pager, a text messaging device, a laptop, a portable digital music player, a two way radio, any mobile phone or other device that communicates data signals, voice or other audio signals, or any combination of the foregoing. In various embodiments, the Device 105 is a phone being used for voice calls by an actual user, wherein the performance metrics are being captured passively by the Device 105 as the user acts as a passive agent while going about his or her regular calling activity. Thus, signal quality measurement may occur during the regular and customary usage of a phone or other device, and may occur while a consumer uses the phone or other device for purposes of voice communication. According to some embodiments, a Mobile Communications Device 105 communicates with the public switched telephone network ("PSTN") 130 through a Mobile Communications Base Station 110, wherein at least a portion of the connection is wireless.

As used in the Application, "cellular" should be interpreted in a broad sense to include any of the variety of known modes of wireless or mobile voice communications. Exemplary cellular systems include, but are not limited to, time division multiple access ("TDMA") systems, code division multiple access ("CDMA") systems, and Global System for Mobile communications ("GSM") systems. Other exemplary cellular systems include systems known in the art as "3G" systems, and Enhanced Data Rates for GSM Evolution ("EDGE") systems.

The term "VoIP" as used herein should be interpreted to mean any type of voice service that is provided over a data network, such as an Internet Protocol based network. The term VoIP is intended to be interpreted broadly to include any system wherein a voice signal from a phone is converted into a digital signal that travels over a data network. VoIP also includes any system wherein a digital signal from a data network is delivered to a phone or other mobile voice communications device, where it is converted into an audio signal.

According to some embodiments, the Mobile Communications Device 105 may preferably be comprised of hardware elements that are electrically coupled via bus, including a microprocessor, a wireless receiver component, a wireless transmitter component, a computer-readable storage media reader, and a memory. Additionally, the storage media reader is further connected to a storage medium. In some embodiments, the Device 105 is further comprised of a SIM card, JavaCard, or other smart card, which may include a microprocessor and storage medium. Additional components may include a microphone and speaker. There may also be other components communicatively coupled to the Device 105, including an output component, such as a screen or other display, and an input component such as a keyboard or touchscreen. Those skilled in the art will recognize that this is but one of a number of possible configurations for the Mobile Communications Device 105.

The Mobile Communications Device 105 may also be coupled to a receiver component which enables the reception of a set of data identifying the location of the Device 105. This data may be referred to hereinafter as "location based data," or alternatively "set of data identifying the location of the device." The receiver may be coupled to the Mobile Communications Device 105 in any suitable manner known in the art. By way of example, it may be an integrated component or may be a stand alone receiver otherwise communicating with the Mobile Communications Device 105. In any case, a Mobile Communications Device 105, as the term is used herein, comprises any of the foregoing configurations.

The location based data may be in the form of Satellite location information (such as Global Positioning System ("GPS") information), cellular location information, network analysis of location information, location information specific to a building, or other means for location determination. The location based data may be based on triangulation using cellular towers or access points. Alternatively, cellular carriers may employ other means of locating cellular telephones and other mobile computing devices using cellular towers. By way of example, the time difference of arrival, angle of arrival, and location pattern matching methods are well known in the art as alternative means of obtaining location information. In some embodiments, the Device 105 receives location based data. According to some embodiments, the location based data may be in the form of GPS coordinates. The location based data may be stored in the Database 125, as described below.

According to various embodiments, a Mobile Communications Device 105 is configured to receive a range of frequencies of electromagnetic waves. The range may be received from one or more Mobile Communications Base Stations 110, or from alternative sources. According to some embodiments, the range is associated with a communications service provider. The range may be comprised of one, or more, signals from a wireless carrier or other wireless communications provider. The range may be comprised of any combination of modulated, multiplexed, digitized, packetized or otherwise encoded signals from a provider of communications services. According to some embodiments, the range comprises at least one modulated voice signal. As used herein, modulated voice signal includes any audio or voice signal that is digitally encoded.

Service providers for cellular and other systems are typically granted or otherwise purchase ranges of frequencies for use in certain geographic areas. However, in some cases, more than one service provider may be associated with a given range of frequencies (as may be the case for a VoIP provider—an example of this type of shared connection is a "WiFi" hot spot that complies with the wireless standards developed in association with IEEE 802.11). The ranges of frequencies granted to different cellular service providers typically do not overlap in a given geographic region. Individual service providers are typically granted contiguous blocks of frequency (often one for transmit and a different one for receive).

A Device 105 may be coupled to any number of antennas and receivers, configured to receive the range of frequencies. A specific range of frequencies to be received may be dictated by the configuration and choice of components of the Device 105. Alternatively, the components may allow the range of frequencies to be received to be modified by the user, the Device 105, a service provider, or another source. A Device 105 may be configured to measure the average power received from the range of frequencies or portion thereof, in a manner known in the art. As noted above, the range may be comprised of one, or more, signals from a wireless carrier or other communications service provider. This average power measurement may thus comprise a signal strength, which is often referred to as Receive Signal Strength ("RSSI"). The measurement may be made whether a call is connected or not.

A Device 105 may be a wireless phone in regular use by a consumer of wireless phone services. The measurement software may be loaded on a variety of commercially available mobile devices. The software may be loaded by the users themselves, and no interaction or provisioning is required from the carriers to be measured or the manufacturers of the devices. Instead, any combination of the measurements may be transmitted over a data or other network and compiled in various fashions, as described herein. The quality measurements described herein may be collected passively as a consumer goes about his or her normal calling activity. The quality measurements may thus be collected in real time over actual routes and usage patterns. In addition, the data may be collected from different service providers. A number of different handset design and cost considerations may govern the configuration of the Device 105. The design and tradeoffs associated with such handsets and alternative devices are well known by those skilled in the art. A Device 105 may comprise a multi-mode phone, and the components of the phone may be configured to measure more than one range of frequencies, associated with more than one service provider.

According to some embodiments, and as noted above, the range of frequencies of electromagnetic waves comprises at least one modulated voice signal associated with a provider of communications services. In some embodiments, the range may comprise a plurality of modulated voice signals. A Device 105 may be configured to measure a signal to noise ("SNR") ratio associated with one or more of these signals, or other signals received by the Device 105. Various methods of measuring SNR on a Device 105 are known in the art, and any of these methods may be so used in a manner consistent with this disclosure.

In some embodiments, one or more of the modulated voice signals are demodulated to reproduce a voice or other audio signal. In such cases, a Device 105 may be configured to measure the voice quality of the reproduced signal. The voice quality measurement functionality may be stored in the storage medium of a Device 105, or may be implemented with a combination of hardware and software. The voice quality reading may make measurements based on the acoustical and psychological properties of human hearing. The Device 105 may be configured to calculate how network impairments combine to affect voice quality as perceived by the customer. Measurements may take into account impairments such as background noise, echo, delay, clipping, coding errors and mismatches in volume level. In VoIP there are unique sources of degradation, including packet loss, jitter, and latency, while cellular calls may be degraded by bit errors, frame erasures and various compression schemes. In some embodiments, the voice quality measurement comprises a Mean Opinion Score ("MOS"). The measurement may be through active or passive voice quality techniques.

Generally, the programs that provide certain functionality for the Device 105 may be stored in the storage medium. Such software may be installed or updated via USB, Bluetooth, Infared, Network 135 download, or other means known in the art. Thus, in some embodiments, users may load the software without provisioning or interaction. Instead, the measurement may take place on a standard handset or other mobile device, and the results may be sent over a data network. Some other measurement systems currently in use may require significant monitoring from a carrier, or special configurations from the OEM. Various embodiments of the invention differ, in that they comprise a software application that can run on many wireless networks. In light of this capability, and as discussed below, the results may be compiled in a database, thus allowing multi-carrier benchmarking. Different metrics for different carriers may be compared over a variety of times and geographic regions.

According to some embodiments, the Device is configured to query a user at the end of a call by display or other means to question whether the call was blocked, or dropped. Such functionality may be incorporated into the storage medium of the device. In some embodiments, the device is further configured with additional functionality to measure additional metrics related to call quality, such as latency, jitter, echo, clipping, clicking and so on. A Device 105 may also be configured to measure the quality of a data network, measuring data speeds, SMS roundtrip time, or other metrics at various locations.

According to various embodiments, the Device 105 measures the average power received by the range of frequencies, the SNR associated with the range, or a combination thereof. The data from these measurements may be collected according to a variety of metrics. In some embodiments, the Device 105 may be programmed to collect data points for these measurements based on (1) the movement of the device ("distance movement metric"), (2) the time elapsed since the last measurement ("time interval metric"), or (3) the earlier of the distance movement metric and time interval metric. Merely by way of example, the Device 105 may be programmed to collect a data point if the location based data indicates a 20 meter change in location from the previous measurement. Also, the Device 105 may be programmed to collect a data point if 10 minutes elapse from the previous measurement. Further, the measurement data points could be taken the earlier of 10 minutes, or a 20 meter change in position. These data points may be collected all the time, whether making calls or not. Alternatively, data points may be collected with different algorithms according to different geographic areas, different times and days, and with different Devices 105. A time, times, or periods of time may also be associated with one or more of the data points or other measurements. The variety of algorithms for the measurement and collection of such data is apparent to one skilled in the art in light of this disclosure.

According to some embodiments, the audio, or voice, quality (hereinafter "quality measurement") of a received voice signal is measured by a Device 105. The quality measurement may take place during a call. In some embodiments, the quality measurement takes place every 10 seconds during a call, and is averaged at the end of the call. The quality measurements may be taken at other intervals as well, for example, based on different geographic areas, different times and days, and with different Devices 105. In certain embodiments, the quality measurement comprises a Mean Opinion Score ("MOS"). A time may also be associated with one or more of the quality measurements.

In some embodiments, a Device 105 is configured to receive information about a blocked or dropped call. The blocked and dropped call measure may take place via a post call interactive questioner, wherein the program containing the questioner is stored in the storage medium. The information may be received via other means known in the art, as well.

According to various embodiments, a Device 105 transmits information including: a measure of the average power received from the range of frequencies, the SNR measure associated with the range, the quality measurement, the blocked and dropped call measure, measurements of data speeds or other data network metrics, the times or time periods of the data points or measures, or any combination thereof. This collection of metrics may be referred to, in any combination, as "signal quality metrics." These transmitted signal quality metrics may be included in a communications signal (hereinafter "communications signal"). The communications signal may also include the location based data. The communications signal may be transmitted at different intervals. For example, the intervals may be related to when each measurement takes place, or may take place at the end of each call. Alternatively, the measurements may be consolidated and transmitted at intervals to maximize power preservation on a Device 105. In some embodiments, the communications signal is transmitted via General Packet Radio Service ("GPRS"). In other embodiments, the communications signal may comprise a wireless signal to be transmitted via WiFi, WiMax, CDMA, UMTS, SMS or any other wireless means. Generally, and as described below, the communications signal may be directed to the Server Computer System 120 and associated Database 125 (which each may be located in a Network 135) via a Mobile Communications Base Station 110. However, according to different embodiments, there are a variety of potential network configurations and protocols to carry the communications signals.

B. Base Station: A Mobile Communications Base Station 110 is a term that should be construed broadly, and comprises any facility or group of facilities which sends radio signals to, or receives them from, a Mobile Communications Device 105. In some embodiments, the signals may be comprised of one or more ranges of frequencies of electromagnetic waves. The signals may be for purposes of cellular telephone communications. In some embodiments, a Base Station 110 is comprised of a Base Transceiver Station ("BTS") and a Base Station Controller ("BSC"). However, in alternative embodiments, a cellular Base Station 110 may be comprised of a variety of different components known in the art, depending on performance considerations and the specific protocols and frequencies at issue.

A Base Station 110 may also be comprised of a wireless access point which sends and receives radio signals to and from the Mobile Communications Device 105. Such a wireless access point includes any device that provides a wireless interface. By way of example, such access points may be WiFi hot spots that comply with the wireless standards developed in association with IEEE 802.11. Those skilled in the art will recognize the myriad of potential configurations surrounding a Mobile Communications Base Station 110.

A Base Station 110 may provide a communications link between a Device 105 and the Server Computer System 120. The communication between a Device 105 and the System 120 may be via a GPRS network, or any Network 135. In certain embodiments, the link may be from a Device 105 through a BSC in a Base Station 110, through a Serving GPRS Support Node ("SGSN") and a Gateway GPRS Support Node ("GGSN") in a GPRS network, through a Network 135, and on to the Server Computer System 120. However, a link between a Base Station 110 and the Server Computer System 120 (and associated Database 125) may include any number of intermediate devices, including routers, switches, or other devices that receive and transmit signals.

A Base Station 110 may also provide a communications link between a Device 105 and Service Provider Equipment 115. Different Base Stations 110 may provide the communications links between the Device 105 and the Service Provider Equipment 115 of different communication service providers. Different Base Stations 110 may provide the communications links between the Device 105 and the Server Computer System 120 and between the Device 105 and the Service Provider Equipment 115. Any of the communications links discussed herein may include any number of intermediate devices, including routers, switches, or other devices that receive and transmit signals.

C. Service Provider Equipment: As noted, the Device 105 may be communicatively connected to Service Provider Equipment 120 from one or more communications service providers according to various embodiments of the invention. The Service Provider Equipment 120 may provide an interface between the Device 105 and the PSTN 130.

The Service Provider Equipment 120 may be comprised of a mobile switching center ("MSC"). To provide connectivity between phone users 140 and the Device 105, the MSC may also be in communication with a telephone network such as the PSTN 130, and may query or otherwise utilize a Signal Control Point ("SCP"), an additional component that is well known to those skilled in the art.

According to other embodiments, the Base Station 110 may be communicatively coupled or otherwise in communication with the Internet, or an other Network 135, which enables a connection to a VoIP switch (i.e. Service Provider Equipment 115). To provide connectivity between phone users 140, the VoIP switch may also be in communication with a telephone network such as the PSTN 130.

D. Server Computer System and Database: Various embodiments of the present invention include a Server Computer System 120, which may include, for example, one or more suitable computing devices such as server computers, personal computers, workstations, web servers, or other such devices. One or more of such devices that collectively comprise the Server Computer System 120 also comprise software elements present on storage media or in memory, which include an operating system and other code.

In various embodiments, the System 120 is in communication with a plurality of Devices 105, and receives the following information: a measure of an average power received by the range of frequencies, the SNR measure associated with the range, the quality measurement, the blocked and dropped call measure, measurements of data speeds or other data network metrics, the times or time periods of the data points or measures, or any combination thereof. As noted above, this collection of metrics may be referred to, in any combination, as "signal quality metrics." These received signal quality metrics may be included in a communications signal transmitted from the Devices 105. The received information may also include the location based data.

The Server Computer System 120 includes application software embodied on a computer readable medium that programs the System 120 to perform one or more functions according to the present invention. For example, application software resident on the Server Computer System 120 may be executable to receive, analyze, store, or transmit measurements and location based data from a Device 105 via a communications signal.

According to alternative embodiments, different combinations of the measurements may be received, analyzed, stored, or transmitted by the System 120. In some embodiments, the System 120 creates image data illustrating a map, with a graphical representation of the location of various received measurements from Devices 105. In some embodiments, the System 120 may create or transmit a table illustrating the location of one or more Devices 105, and the average power measurements or other measures associated therewith. In other embodiments, the System 120 determines a plurality of geographic regions linked with locations, and displays a table with different combinations of measurements associated with those locations and regions. In some embodiments, the System 120 determines regions with minimum or greater signal quality metrics. Information may be retrieved from, or stored, in the Database 125. Information (such as tables, image data, or consolidated data) created by the System 120 may be transmitted over a Network 135 to a desktop computer 145 or other workstation, where carriers, enterprises, or other users may access the information. It will be apparent to those skilled in the art that substantial variations may be implemented in accordance with the specific requirements of the different embodiments. The Server Computer System 120 may be fully located within a single facility or distributed geographically, in which case a Network 135 may be used to integrate different components of the Server Computer System 120.

The Server Computer System 120 may be associated with at least one Database 125, according to various embodiments of the invention. In different embodiments, the Database 125 may contain the following information received from the Devices 105: a measure of an average power received by the range of frequencies, the SNR measure associated with the range, the quality measurement, the blocked and dropped call measure, data speeds, other data network metrics, other signal quality metrics, the times or time periods of the data points or measures, location based data, and geographic region data. The Database 125 may also contain user and Device 105 related information (e.g. MAC address, IP address, phone number, IMSI, or IMEI), and service provider information (e.g. service provider, system carrier, or network carrier). The Database 125 may include any number of tables and sets of tables. Application software running on the Server Computer System 120 queries the Database 125, and produces forms, reports, tables, images or other output as dictated by the application software.

The Database 125 may be incorporated within the Server Computer System 120 (e.g. within its storage media), or may be a part of a separate system associated with the Server Computer System 120. The Database 125 may be fully located within a single facility or distributed geographically. The Database 125 may be organized in any manner different than described above to provide the functionality called for by the various embodiments, as known by those skilled in the art.

According to various embodiments, the Database 125 includes an electronic map database, providing data related to streets, buildings, malls, parks, lakes, rivers, mountains, and other related geographic and topographic information. This information may be configured to be correlated against coordinates that are produced with location based data received by the Server Computer System 120. Tables may be comprised of data on large geographic areas, such as countries, states, and counties. Tables may also be comprised of smaller geographic areas, such as urban areas, cities, communities, and the like. Different sizes, shapes, colors, dots, icons, and fonts may be used to indicate different features. The content of the electronic map database may include any combination of the aforementioned attributes and information. The design and organization of the aforementioned tables is discretionary and within the skill of those of ordinary skill in the art, given the descriptions of data fields herein.

Figure 1B:
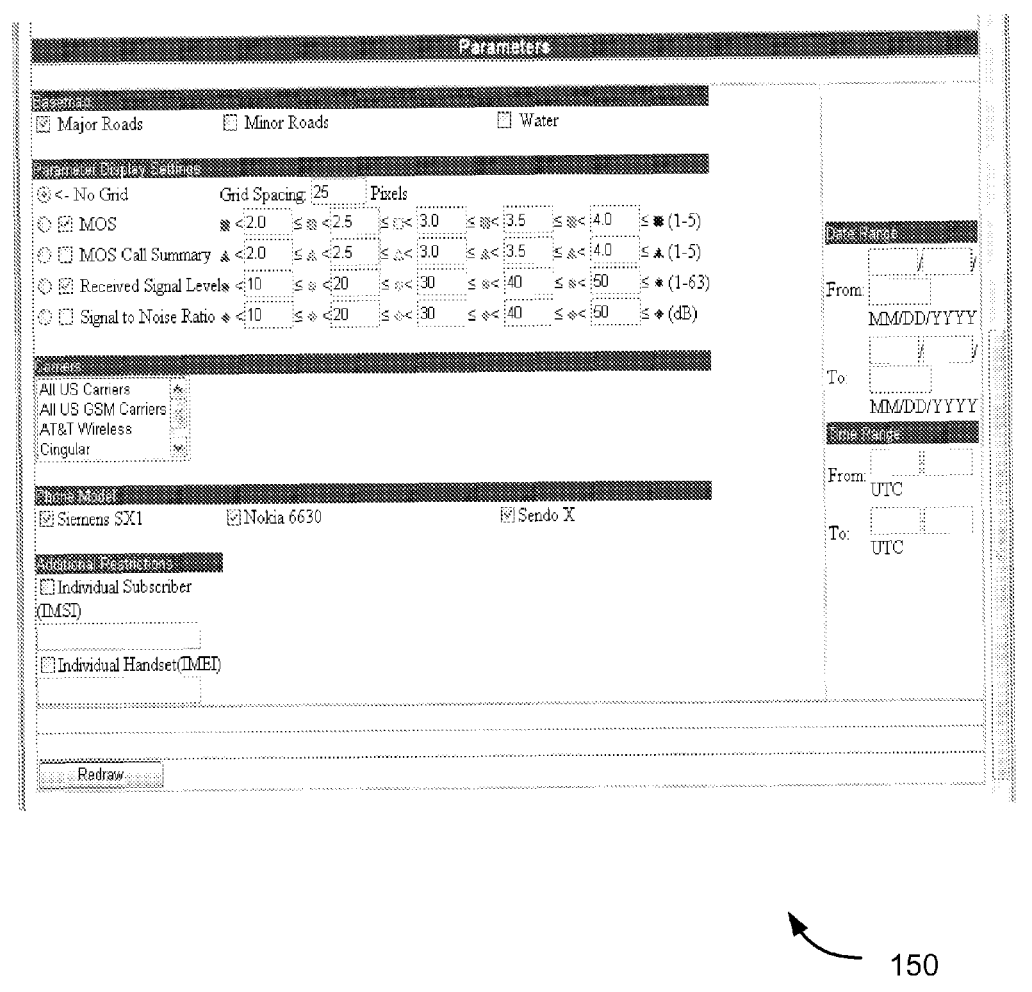

E. User Interface: According to various embodiments of the invention, the Database 125 may be accessed over a Network 135 via any connected device 145, or via a direct connection to the Database 125. An interface may be used to access and parse the data, and the data may be parsed in a variety of ways. An exemplary user interface 150 which illustrates different ways in which the data may be parsed is shown in FIG. 1B. As illustrated, the data may be broken down according to the following: ranges of dates, ranges of time, subscribers, classes of subscriber, specific handset, Device 105 model, carrier, service provider, geographic region, signal quality metrics or any combinations or subcombinations thereof. It is worth noting that data from different carriers and other service providers may be collected into one Database 125 in real-time.

Exemplary date filter periods may include: past 24 hours, past 7 days, past month, past 3 months, past 6 months, or specific start and end dates. Exemplary time filter periods may include: past 15 minutes, past 30 minutes, past hour, past 3 hours, peak AM, peak PM, off peak AM, off peak PM, or specific start and end times. Exemplary geographic areas may be cities, states, or specific sub-regions created in a variety of ways known in the art. Information may be viewed along various service provider or network metrics. A user interface may also illustrate various metrics related to coverage over an area with a minimum signal quality metric. The filters and other parameters illustrated in this paragraph are for purposes of example only, and a variety of additional metrics may be used as is evident to one skilled in the art.

Figure 1C:
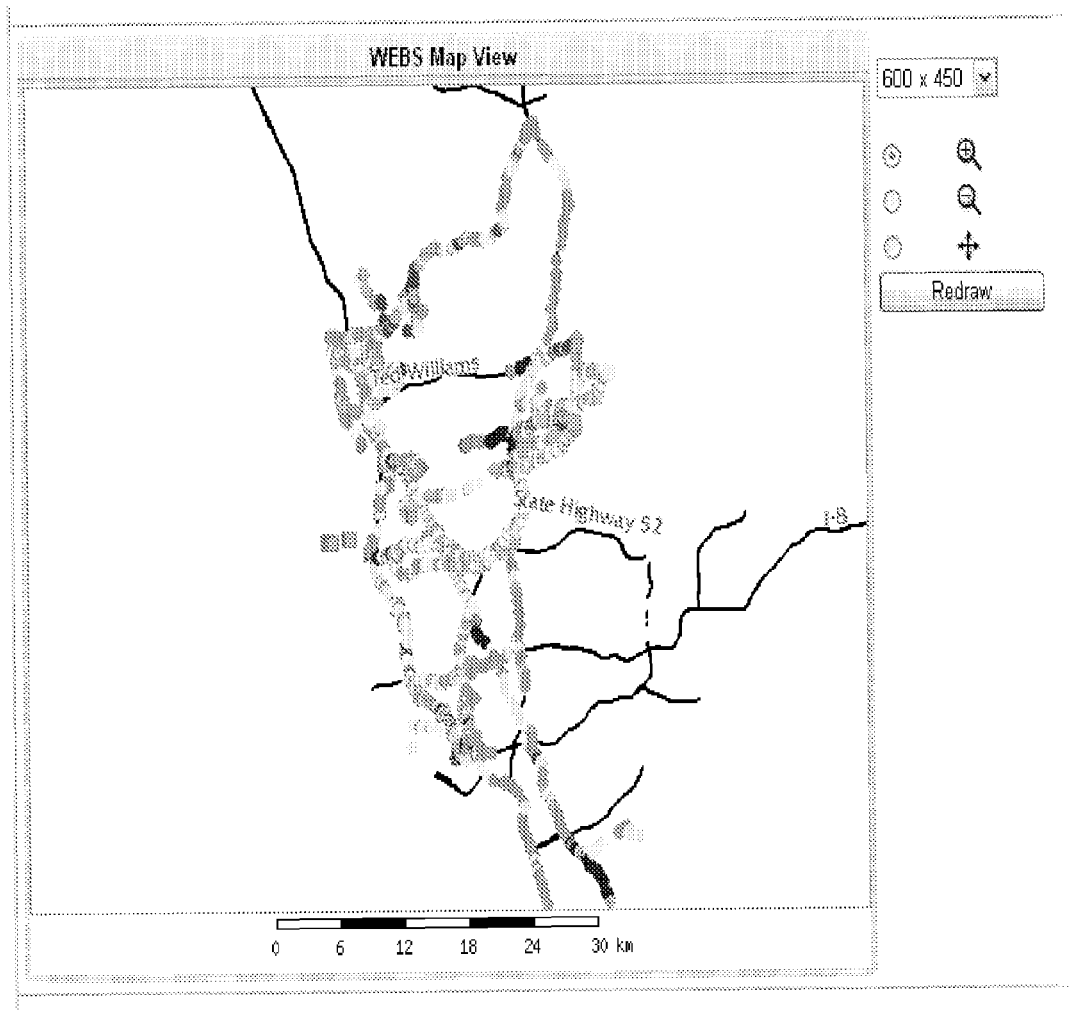
FIG. 1C represents an example of image data for measuring the performance of a provider of communication services according to various embodiments of the present invention.
Figure 1D:
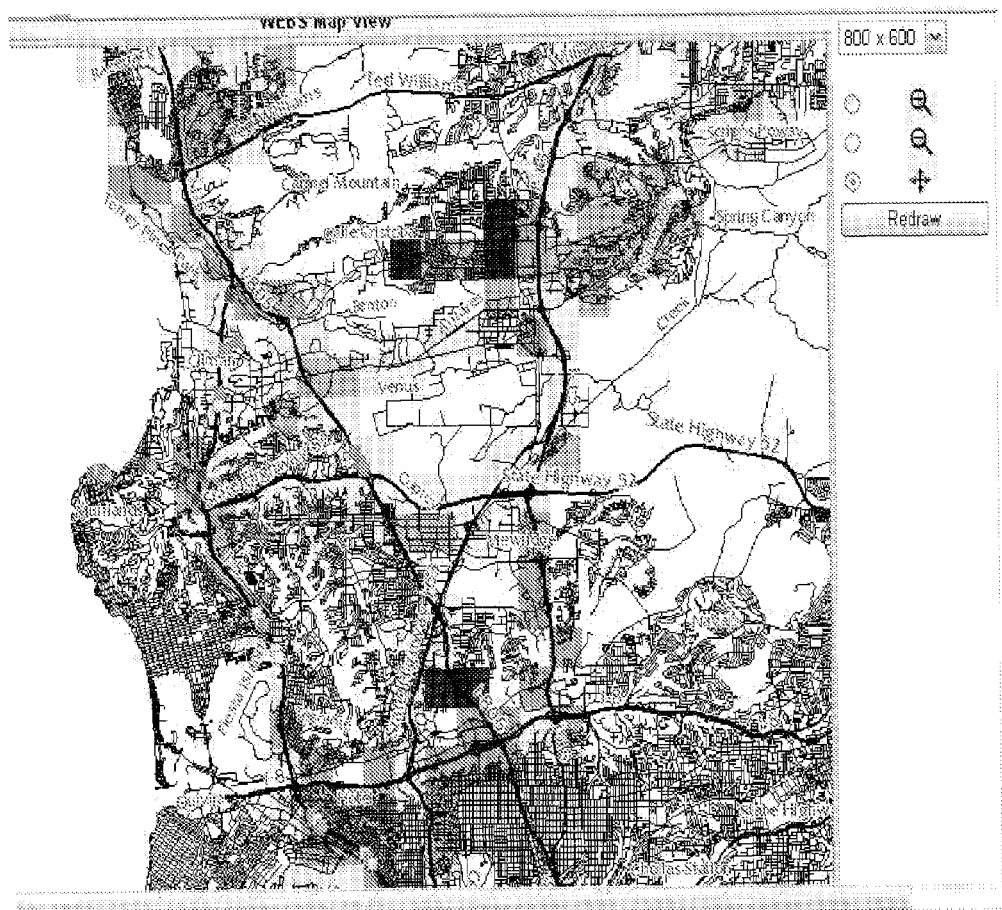
FIG. 1D represents another example of image data for measuring the performance of a provider of communication services according to various embodiments of the present invention.
Figure 1E:
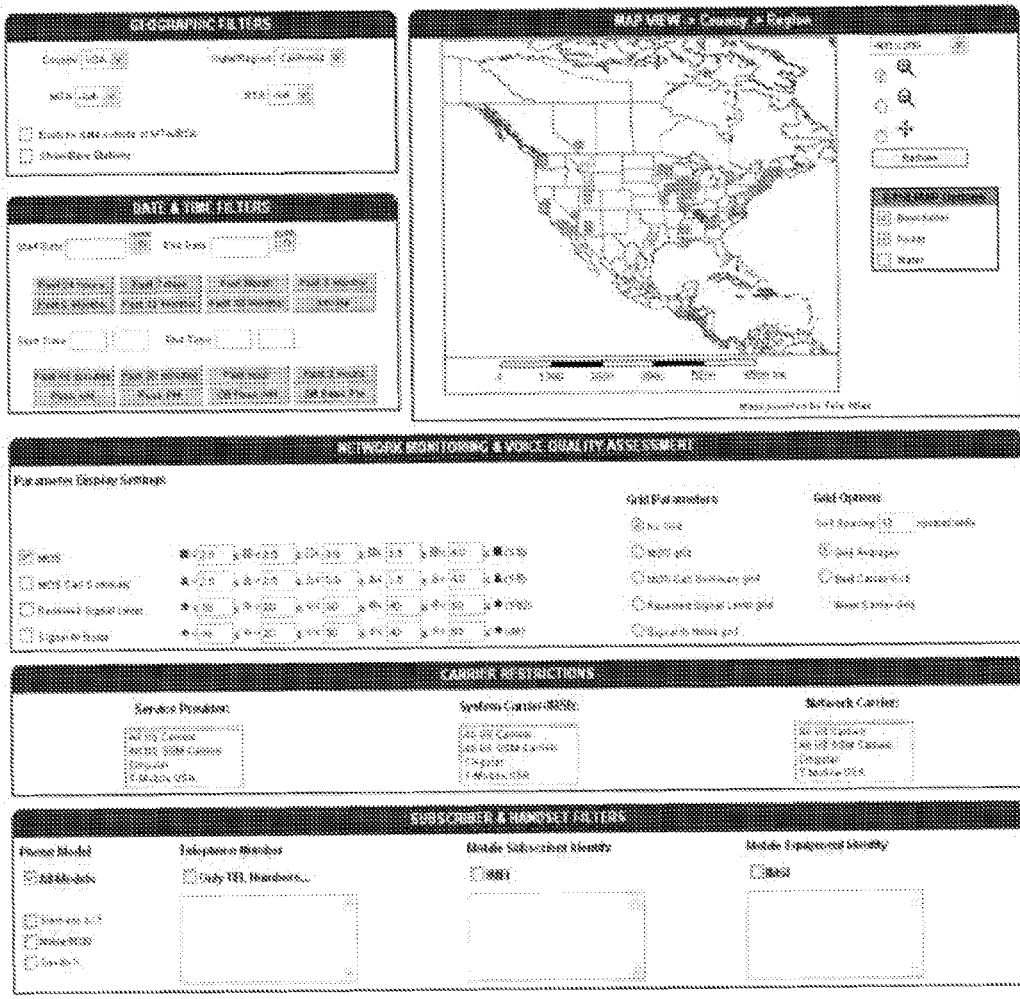
FIG. 1E represents an example of an interface showing a table with image data, illustrating measurement of the performance of a provider of communication services according to various embodiments of the present invention.
Figure 1F:
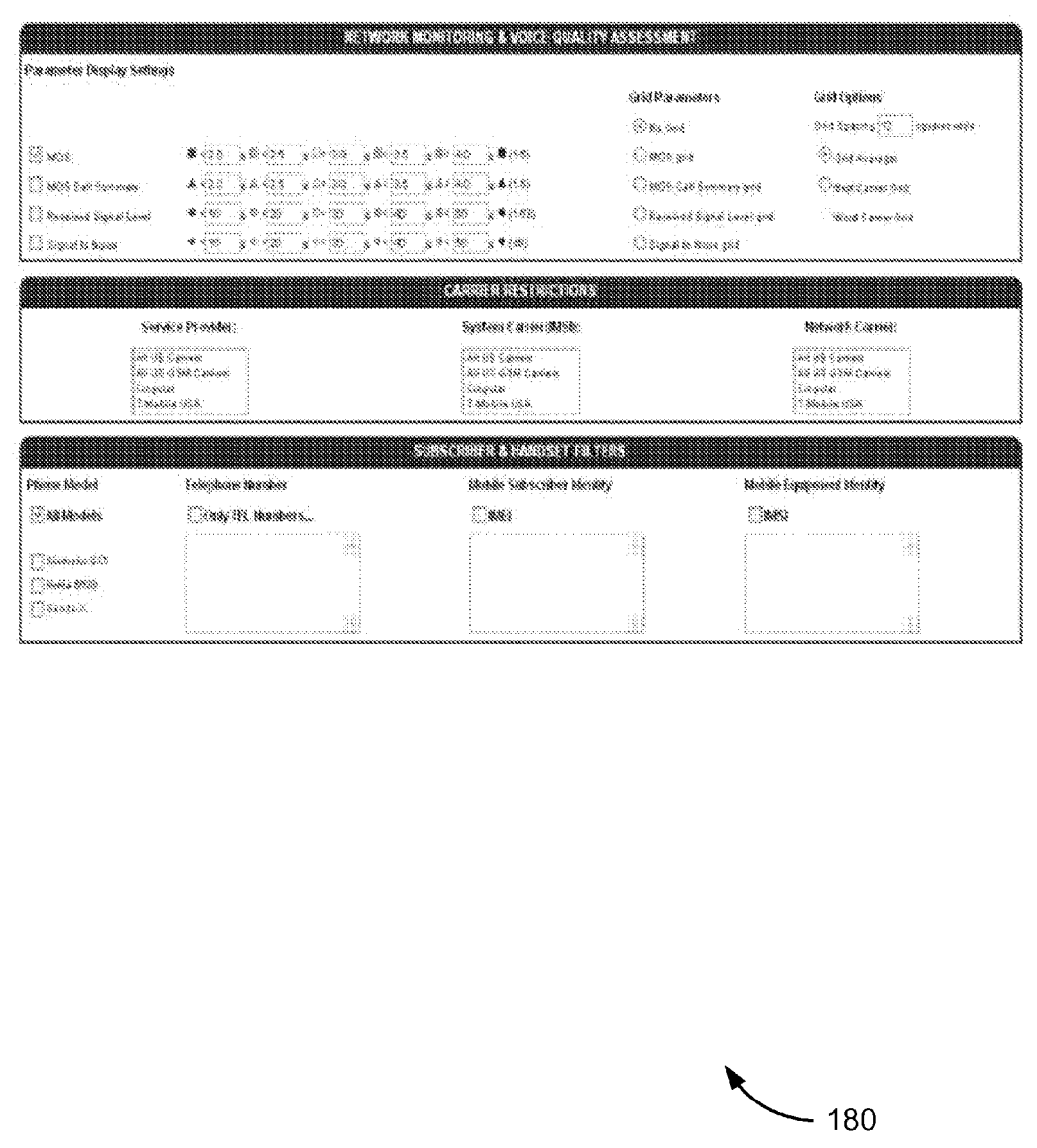
Figure 1G:
FIG. 1G represents another example of a table illustrating certain data points for measuring the performance of a provider of communication services according to various embodiments of the present invention.

According to some embodiments, the parsed data may be illustrated in a table, or in image data comprising a map of geographic areas of different sizes. The user interface, an example 150 of which is illustrated in FIG. 1B, may be configured to allow a user to create the table or map according to the criteria listed above. Different colors or shades of gray may illustrate different levels of signal quality metrics for measurements for certain geographic regions. In various embodiments, a map may illustrate major or minor roads, water, or other features. The interface may dictate the parameters to which the map will be drawn. One example 160 of such a map for a larger region is shown in FIG. 1C. Another example 170 for a smaller region is illustrated in FIG. 1D. The user interface may include both a series of tables and a map, as illustrated in the example 175 shown in FIG. 1E. The user interface, and tables contained therein, may be broken down to illustrate various signal quality metric parameters, different carriers and providers, and different subsets of subscribers, as illustrated in the example 180 shown in FIG. 1F. Also, the user interface, and tables contained therein, may be broken down to illustrate various geographic regions, and different time periods, as illustrated in the example 185 shown in FIG. 1G. With the variety of user interfaces, multi-carrier benchmarking is possible, comparing different providers over a variety of times, dates, and geographic regions, and according to various signal quality metrics.

II. Different Embodiments: With a better understanding of the various components of the invention, a closer examination of specific embodiments may provide a more thorough view and illustration of the different elements of the invention.

Figure 2:
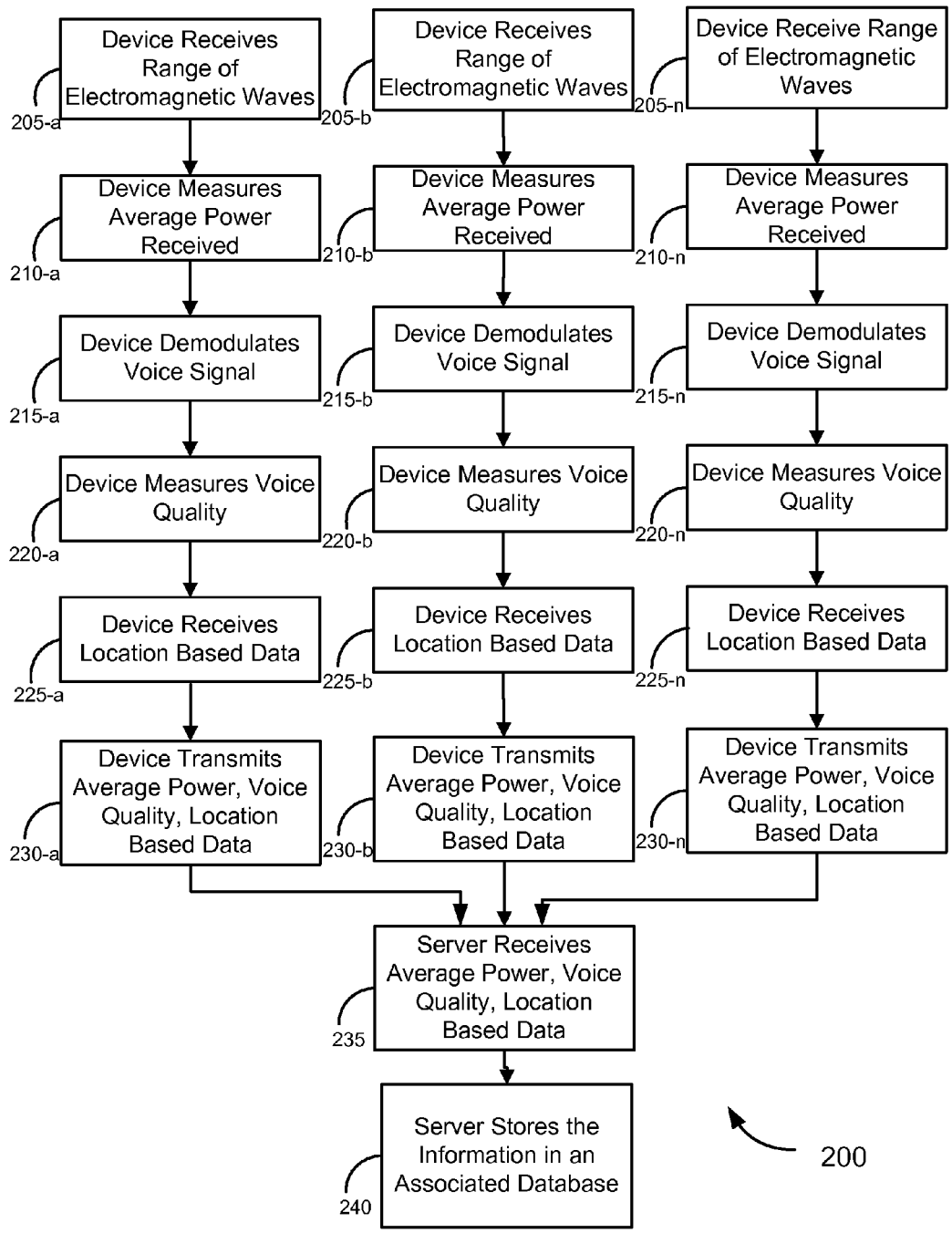
FIG. 2 is flow diagram that illustrates a system for measuring the performance of a provider of communication services according to various embodiments of the present invention.

A. System: In some embodiments of the invention, a communications system 200 for measuring the performance of a provider of communications services is described, as illustrated in FIG. 2. This system may be implemented within the broader communications system 100 illustrated in FIG. 1. The system 200 includes a plurality of Mobile Communications Devices 105-a . . . n. Each Device 105 is configured to receive a range of frequencies of electromagnetic waves at block 205. The range may comprise one or more signals from a communications service provider, which may be a wireless carrier operating a cellular system. Each Device 105 may measure the average power received from the range over a period of time, block 210, the measure comprising one or more data points. Each Device 105 may demodulate a subset of the received range to reproduce a voice signal at block 215, and measure the voice quality of the reproduced voice signal at block 220. The voice quality measure may comprise an MOS. At block 225, each Device 105 may receive a set of data identifying the location of the device. This location based data may be comprised of GPS coordinates.

At block 230, each Device transmits a communications signal which includes the average power received by the range, the voice quality measurement, and the location based data. According to some embodiments, a Device 105 may also measure and transmit information on SNR and blocked or dropped calls. The transmission may occur at different intervals, and one Device 105 may make multiple transmissions. The communications signal may be transmitted via GPRS, although the signal may also be transmitted via a variety of other means known in the art.

The system is further comprised of a Server Computer System 120, in communication with each Device 105. The System 120 is configured to receive the communications signals from all of the Devices 105 at block 235, and store the information included in the communications signal in a Database 125 associated with the System at block 240.

Figure 3:
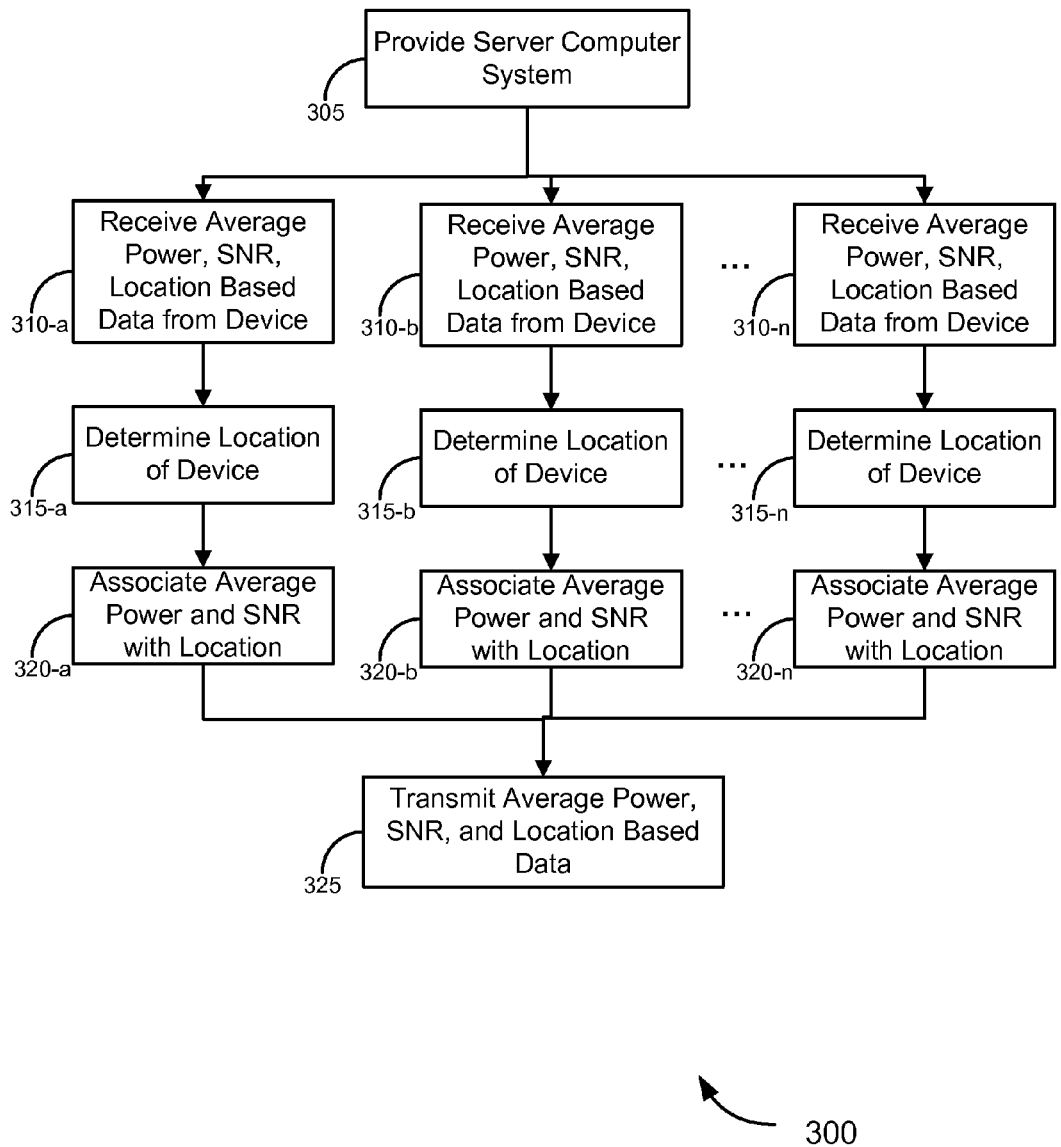
FIG. 3 is flow diagram that illustrates a method for measuring the performance of a provider of communication services according to various embodiments of the present invention.

B. Server—Method: In some embodiments of the invention, a method 300 for measuring the performance of a provider of communications services with a server is described, as illustrated in FIG. 3. At block 305, a Server Computer System is provided, and an example of such a Server is illustrated at 120 in FIG. 1A. At block 310, the System 120 receives at least one communications signal from each of a plurality Devices 105. In this embodiment, each signal or collection of signals includes a measure of the average power received by each Device 105 for a range of frequencies of electromagnetic waves, a measurement of a signal to noise ratio for the range received, and a set of data identifying the location of the Device 105. According to other embodiments, measurements including voice quality and blocked/dropped calls may also be included. At block 315, the System 120 determines the location of each Device 105 of the plurality in light of the location based data. At block 320, the System associates the average power and SNR measurements for each Device with the determined location.

At block 325, the System 120 transmits a subset of the information related to the Average Power, SNR, and associated locations. According to some embodiments, the subset may comprise image data containing a graphical representation of each location and the average power associated with each location. FIG. 1C illustrates an example 160 of such image data, and FIG. 1D illustrates another such example 170. In some embodiments, the subset comprises an interface comprising a table, an example 370 of which is illustrated is FIG. 1B.

Figure 4:
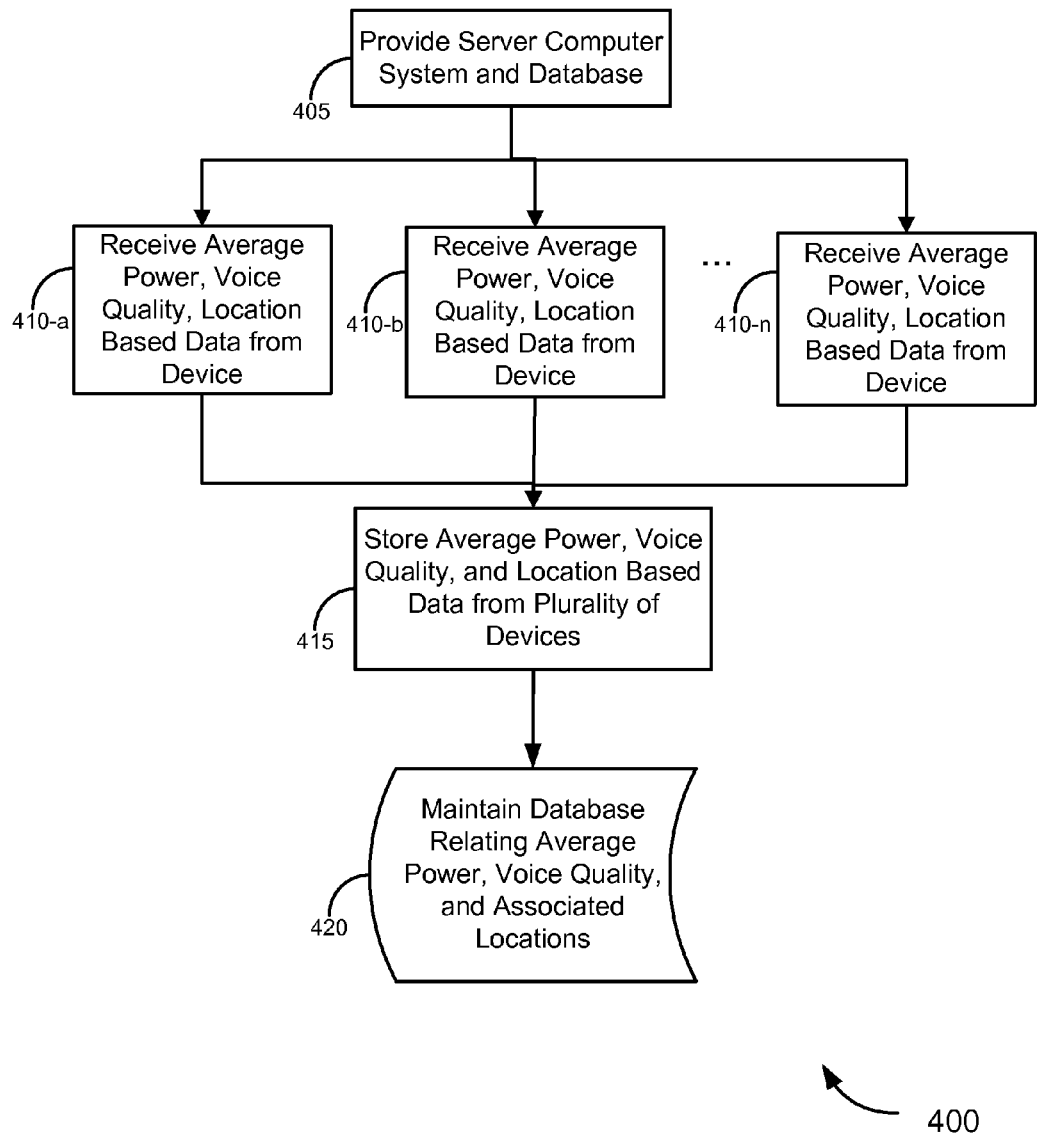
FIG. 4 is flow diagram that illustrates a method of creating a database for measuring the performance of a provider of communication services according to various embodiments of the present invention.

C. Database—Method: In some embodiments of the invention, a method 300 of measuring the performance of a provider of communications services with a database is described, as illustrated in FIG. 4. At block 405, a Server Computer System 120 and associated database are provided. An example of such a database is illustrated at 125 in FIG. 1A. At block 410, the System 120 receives at least one communications signal from each of a plurality of Devices 105. In this set of embodiments, each signal or collection of signals includes a measure of the average power received by each Device 105 for a range of frequencies of electromagnetic waves. In various embodiments, the range may comprise a wireless signal or signals from a wireless carrier operating a cellular network. In this set of embodiments, the communications signal or set of signals may include measurement of the voice quality, which may comprise an MOS. The communications signal or set of signals may further include a set of data identifying the location of the Device 105, which may comprise GPS coordinates. According to other embodiments, measurements including SNR and blocked/dropped calls may also be included. In still other embodiments, the times or time periods of the data points or measures may be received as well.

At block 415, the System 120 stores the information included in each signal or signals in the Database 125. At block 420, the Database is maintained with the stored information. Such maintenance may include the creation and maintenance of relational tables. By way of example, links between locations and the associated average power and voice quality measurements may be included. In addition, links between the locations and SNR measurements, blocked/dropped calls, and times or time periods of the data points or measures may be included as well.

Figure 5:
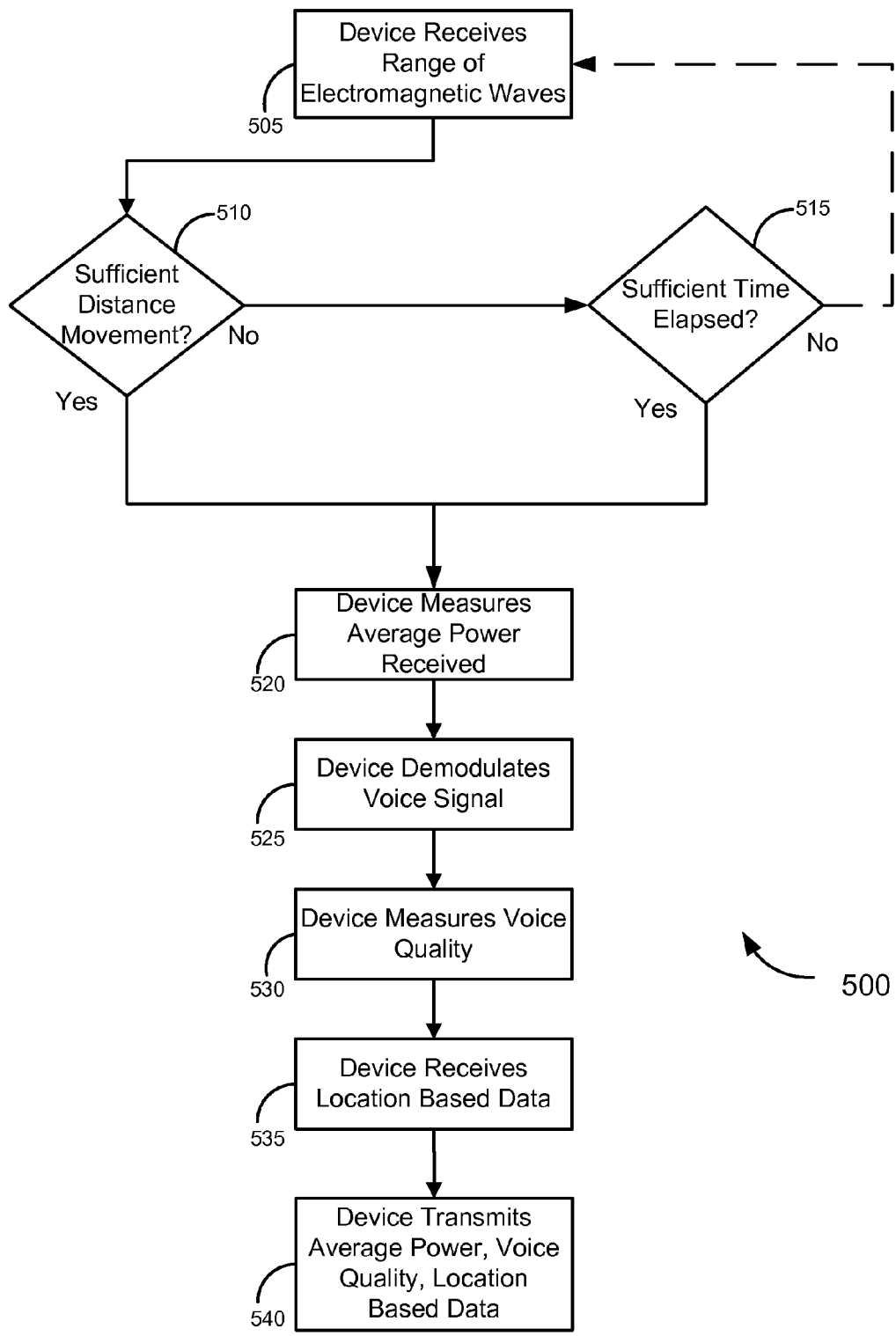
FIG. 5 is flow diagram that illustrates the configuration of a device to be used for measuring the performance of a provider of communication services according to various embodiments of the present invention.

D. Device: In some embodiments of the invention, a device 500 configured to transmit information related to measuring the performance of a provider of communications services is described, as illustrated in FIG. 5. An example of such a device is illustrated at 105 in FIG. 1A. The Device 105 is configured to receive a range of frequencies of electromagnetic waves at block 505. The range may comprise one or more signals from a communications service provider, which may be a wireless carrier operating a cellular system. A Device 105 may measure (at block 520) the average power received from the range when the device has moved a sufficient distance 510, or when a sufficient time has passed 515, whichever occurs first. According to some embodiments, the distance metric is 20 meters, and the time interval metric is 10 minutes.

Each Device 105 may demodulate a subset of the received range to reproduce a voice signal at block 525, and measure the voice quality of the reproduced voice signal at block 530. The voice quality measure may comprise an MOS. At block 535, each Device 105 may receive a set of data identifying the location of the device. This location based data may be comprised of GPS coordinates. At block 540, each Device transmits a communications signal which includes the average power received by the range, the voice quality measurement; and the location based data.

Figure 6:
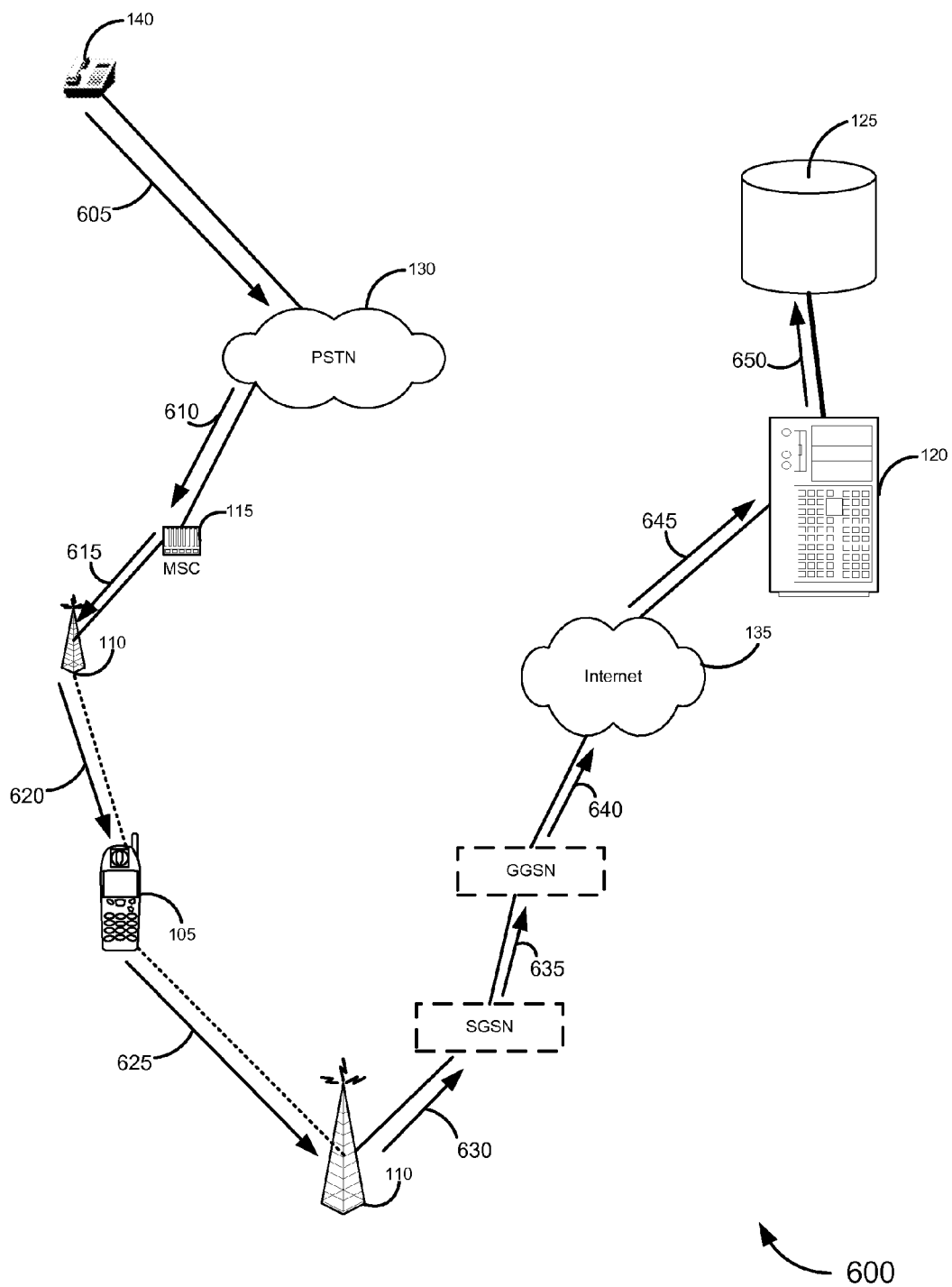
FIG. 6 is an exemplary embodiment of a communications system for measuring the performance of a provider of communication services according to various embodiments of the present invention.

E. Specific Embodiment: Having shown many broad embodiments of the invention, it may be useful to illustrate a more specific embodiment. The following embodiment is for exemplary purposes only. In this embodiment, illustrated in FIG. 6, a phone call is connected from a telephone 140 to a Device 105. A voice signal is modulated and transmitted 605 from the telephone 140 to the PSTN 130. From the PSTN 130, the signal is forwarded 610 to an MSC (i.e. Service Provider Equipment 115) associated with a service provider. The signal is then forwarded 615 through a BSC and BTS (i.e. Base Station 110). The modulated voice signal is then forwarded 620 to the Device 105 from the BTS in the form of a range of frequencies of electromagnetic waves.

The Device 105 may measure the average power received for the range of frequencies, the SNR, and the voice quality, and may also receive location data. The Device may then packetize and transmit 625 the measurements and location data using GPRS, through a BTS and BSC (Base Station 110). The GPRS packets travel 630 through an SGSN and are then forwarded 635 through a GGSN. The packets are then transmitted 640 over the Internet 135, to 645 the Server Computer System 120. The information may then be stored 650 in the Database 125. Similar transmissions are made from a plurality of Devices 105 to measure the performance of a wireless carrier.

It should be noted that the methods, systems and devices discussed above are intended merely to be exemplary in nature. Consequently, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the above described embodiments may be combined in a similar manner.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed:

1. A system for measuring performance of a provider of communications services, the system comprising:
    a server;
    a data storage system connected to the server;
    means for instructing each of a plurality of mobile devices to measure an average power received from a range of frequencies at predetermined time intervals and a time at which each measurement is made;
    means instructing each of the mobile devices to demodulate a subset of the range of frequencies to produce a demodulated voice signal;
    means for instructing the measurement of a voice quality measurement of the demodulated voice signal when the mobile device is in use, the voice quality measurement based on acoustical properties of human hearing;
    means for identifying the location of the device;
    means for instructing the mobile communication device to collect data points for measurements of the average power received, measurements of the time at which the average power received is measured, the voice quality measure and for the location of the device, wherein the data points are collected based on a metric selected from the group consisting of a time interval metric and a distance movement metric;
    means for receiving at the server sets of data comprising;
    all data points collected for the measurement of the average power received from the range and the time at which the data points for the measurement of the average power received were made;
    all data points collected for the measurement of the voice quality measurement and the time at which the data points for the measurement of the voice quality were made; and
    the location of the device at the time at which the collection of the data points for the measurement of the voice quality and the measurement of the average power received were collected; and
    a database in the storage system for storing the sets of data.

2. The system of claim 1, wherein the provider of communications services is a wireless carrier operating a cellular system.

3. The system of claim 1, wherein the range of frequencies of electromagnetic waves received comprises a wireless signal from the provider of communications services, and wherein the metric is a distance movement metric for determining whether the device has moved a predetermined distance.

4. The system of claim 1, wherein the range of frequencies of electromagnetic waves received comprises a modulated voice signal, and wherein the metric is a time interval metric for determining whether a predetermined amount of time has passed since a previous measurement.

5. The system of claim 1, wherein the database also contains user and mobile device information.

6. The system of claim 1 wherein the database further comprises an electronic map database.

7. The system of claim 1 further comprising a user interface to access the database.

8. A method for measuring performance of a provider of communications services, the method comprising:
    instructing each of a plurality of mobile devices to measure an average power received from a range of frequencies at predetermined time intervals and a time at which each measurement is made;
    instructing each of the mobile devices to demodulate a subset of the range of frequencies to produce a demodulated voice signal;
    instructing the measurement of a voice quality measurement of the demodulated voice signal when the mobile device is in use, the voice quality measurement based on acoustical properties of human hearing;
    identifying the location of the device;
    instructing the mobile communication device to collect data points for measurements of the average power received, measurements of the time at which the average power received is measured, the voice quality measure and for the location of the device, wherein the data points are collected based on a metric selected from the group consisting of a time interval metric and a distance movement metric;
    receiving at a server sets of data comprising;
    all data points collected for the measurement of the average power received from the range and the time at which the data points for the measurement of the average power received were made;
    all data points collected for the measurement of the voice quality measurement and the time at which the data points for the measurement of the voice quality were made; and
    the location of the device at the time at which the collection of the data points for the measurement of the voice quality and the measurement of the average power received were collected; and
    storing the sets of data in a database in a storage system.

9. The method of claim 8, wherein the provider of communications services is a wireless carrier operating a cellular system.

10. The method of claim 8, wherein the range of frequencies of electromagnetic waves received comprises a wireless signal from the provider of communications services, and wherein the metric is a distance movement metric for determining whether the device has moved a predetermined distance.

11. The method of claim 8, wherein the range of frequencies of electromagnetic waves received comprises a modulated voice signal, and wherein the metric is a time interval metric for determining whether a predetermined amount of time has passed since a previous measurement.

12. The method of claim 8, wherein the database also contains user and mobile device information.

13. The method of claim 8 wherein the database further comprises an electronic map database.

14. The method of claim 8 further comprising a providing user interface to access the database.

* * * * *